United States Patent [19]
Lacy et al.

[11] Patent Number: 5,651,577
[45] Date of Patent: Jul. 29, 1997

[54] VISOR EXTENSION

[75] Inventors: Jim Lacy, Gladstone, Oreg.; Mary Martha Hood, Bakersfield, Calif.

[73] Assignee: Nap-Kit, Inc., Gladstone, Oreg.

[21] Appl. No.: 585,276

[22] Filed: Jan. 11, 1996

[51] Int. Cl.$^6$ .................................................. B60J 3/02
[52] U.S. Cl. ........................................ 296/97.6; 296/97.8
[58] Field of Search .................................. 296/97.6, 97.5, 296/97.1, 97.8; 160/DIG. 3

[56] References Cited

U.S. PATENT DOCUMENTS

| | | | |
|---|---|---|---|
| 2,323,072 | 6/1943 | Murata | 296/97.6 |
| 2,382,875 | 8/1945 | Handley | 296/97.6 |
| 2,432,674 | 12/1947 | Office | 296/97.6 X |
| 2,842,395 | 7/1958 | Davis | 296/97.6 |
| 3,515,427 | 6/1970 | Van Sickle . | |
| 3,617,088 | 11/1971 | Graham . | |
| 3,695,658 | 10/1972 | Vacha . | |
| 3,754,810 | 8/1973 | Starczewski . | |
| 4,023,854 | 5/1977 | Nack . | |
| 4,058,340 | 11/1977 | Pinkas . | |
| 4,330,148 | 5/1982 | LaMont . | |
| 4,889,380 | 12/1989 | Pillifant, Jr. | 296/97.6 |

FOREIGN PATENT DOCUMENTS

| | | | |
|---|---|---|---|
| 575011 | 3/1957 | Italy | 296/97.6 |
| 2094248 | 9/1982 | United Kingdom | 296/97.6 |

*Primary Examiner*—Joseph D. Pape
*Attorney, Agent, or Firm*—Robert L. Harrington

[57] ABSTRACT

A visor extension removably mountable on a vehicle visor to extend the shading or screening capability of the vehicle visor. The visor extension has a front panel and a rear panel joined together at their upper edges by a center strip that is shorter than the panels. The strip and the panels in combination form slots at each end of the center strip. Releasable mateable fasteners are provided on the lower edges of each panel to secure the visor extension on the vehicle visor. The visor extension is movable on the vehicle visor to enhance the shading capability. The formed slots permit the visor extension to be moved beyond an end attachment that attaches the visor to the vehicle.

3 Claims, 2 Drawing Sheets

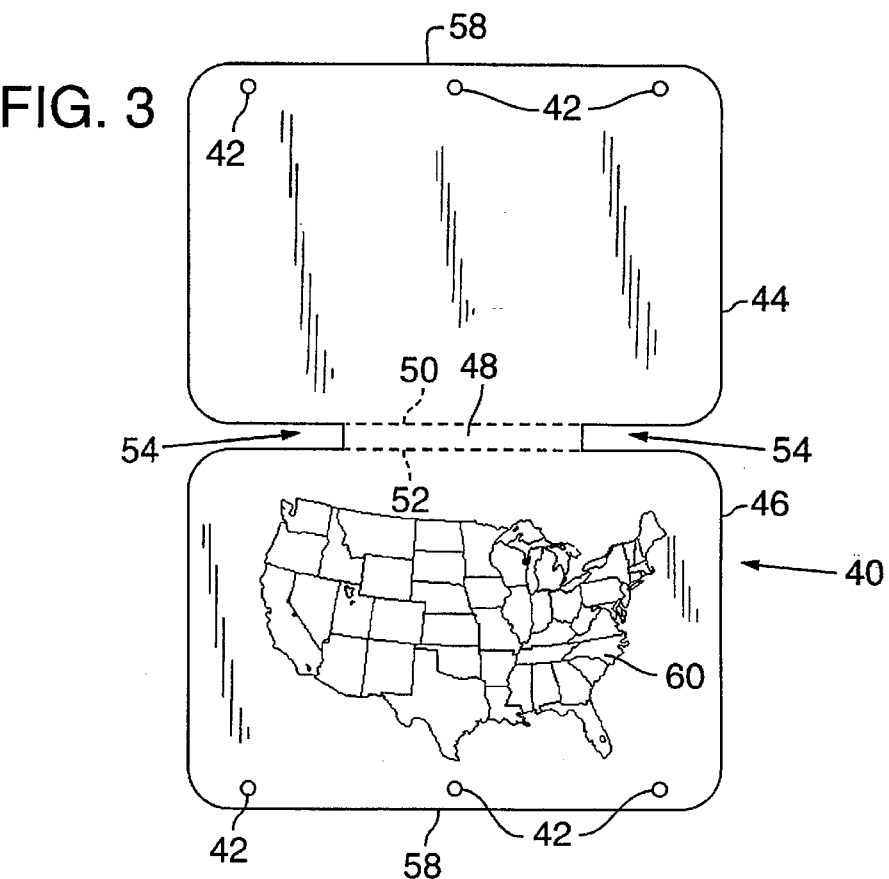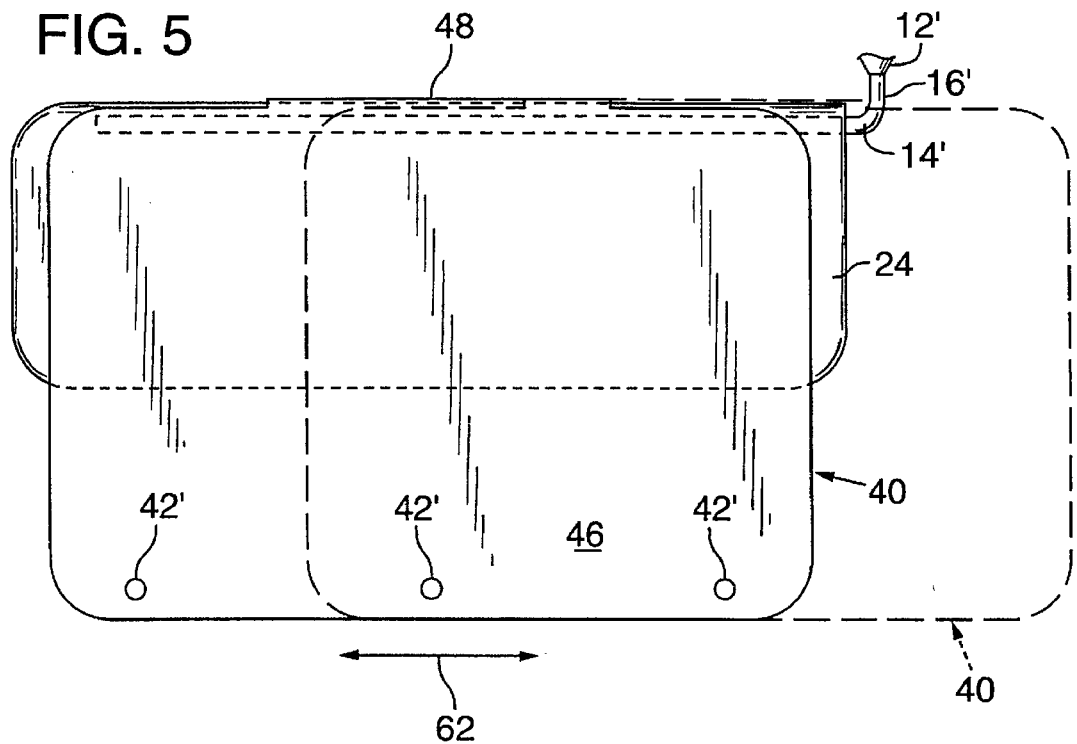

5,651,577

VISOR EXTENSION

FIELD OF THE INVENTION

This invention relates to sun visors for vehicles and more particularly relates to an extension mountable to a vehicle's sun visor.

BACKGROUND INFORMATION

There are many vehicles today that have very large windshields. Typical of these vehicles are motor homes, delivery vans, tractors for semi-trailers and the like. The large windshields provide for good visibility. However, the large windshield increases exposure of the persons riding in the front seats to the sun's rays. The standard visors that are provided in these vehicles generally are not large enough to provide adequate protection from the sun's rays, particularly when the sun is near the horizon and/or the vehicle is traveling at an angle to the direction of the sun's rays. Under such conditions, the sun's rays projecting through the windshield will be directed directly into the face of such persons in the front seats causing considerable discomfort and vision impairment.

It is, therefore, an object of the present invention to provide a visor extension which is removably mountable to a conventional visor provided in such a vehicle that will provide added shading or screening for the individuals seated in the vehicle's front seat. Whereas the invention is considered most desirable for vehicles having the large windshield, it is applicable also to passenger vehicles including pick-ups and sport utility vehicles.

BRIEF SUMMARY OF THE INVENTION

The present invention in its preferred embodiment is a light weight, low cost extension that is removably mountable on the standard visor of a vehicle. The extension is simply mounted onto the visor of the vehicle and is secured, e.g., by releasable fasteners. The extension, when mounted on the visor of the vehicle, extends below the visor to provide protection when the sun's rays drop below the standard visor. The mounting of the extension on the conventional visor does not require any alteration to the conventional visor nor does it impede or hinder its normal operation. The extension on the visor is also adjustable to the left or to the right on the visor to provide protection beyond the sides of the visor. The visor extension provides a large display area that may be imprinted with maps, information tables and the like.

Refer now to the drawings and the detailed description for a full understanding of the invention.

BRIEF DESCRIPTION OF THE DRAWINGS

FIG. 3 is a view of the visor extension of the present invention as seen in FIG. 2 laid out flat and showing the front and rear panels and the connecting hinge unit;

DESCRIPTION OF THE PREFERRED EMBODIMENT

Figure 1:
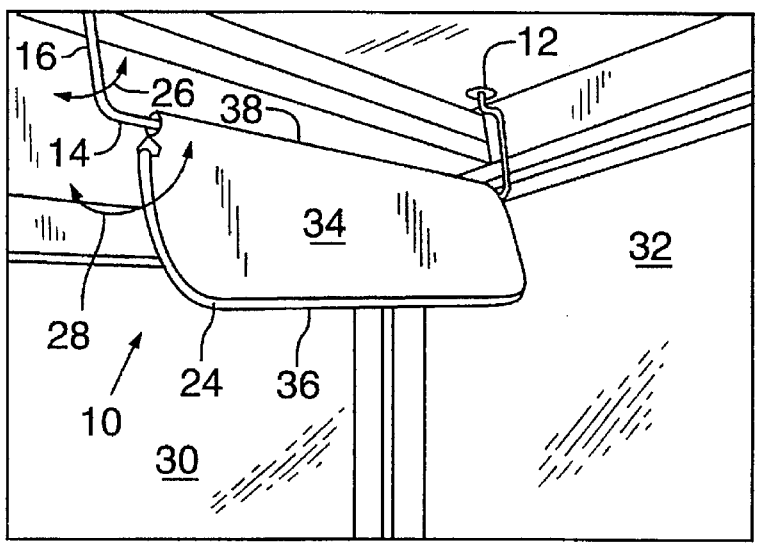
FIG. 1 is a partial view of an interior of a vehicle showing a conventional sun visor, e.g., for a motor home.

FIG. 1 illustrates a sun visor assembly 10 that is normally provided with a vehicle such as a motor home, tractor and the like. The sun visor assembly 10 has brackets 12 for mounting the sun visor assembly 10 to the vehicle. A U-shaped rod 14 extends from the brackets 12 and adjustably supports a visor 24. The rod 14 may be pivoted on the brackets 12 as indicated by arrow 26. The visor 24 is arranged to be pivoted on the rod 14 to an infinite number of positions in a conventional manner as indicated by arrow 28. The rod 14 and the visor 24 frictionally engage each other sufficiently to maintain the visor in an adjusted position. In this embodiment, the visor 24 of the visor assembly 10 is positioned strategic to a front windshield 30. When required, the rod 14 is pivoted on the brackets 12 and/or the visor 24 is pivotally adjusted on the rod 14 to a desired position to shade the viewer's eyes from the sun's rays.

FIG. 1 illustrates but one example of a mounting arrangement for a visor assembly 10 of a vehicle. FIG. 5 illustrates another example of a mounting arrangement for the visor assembly 10 as more commonly provided in a passenger vehicle. As shown in FIG. 5 a single bracket 12' supports an L shaped rod 14'. The visor 24 is pivotally mounted on the rod 14'. The vertical portion 16' of the rod 14' is rotatable in the bracket 12' so that the visor 24 may be positioned in front of the windshield 30 or a side window 32 (FIG. 1). It will be appreciated that vehicle manufacturer's and others will utilize numerous modifications and variations to mount their conventional visors. The visor extension of the present invention, as is shown in subsequent figures and is later described, is configured to be mountable on other visors having different mounting arrangements.

Figure 2:
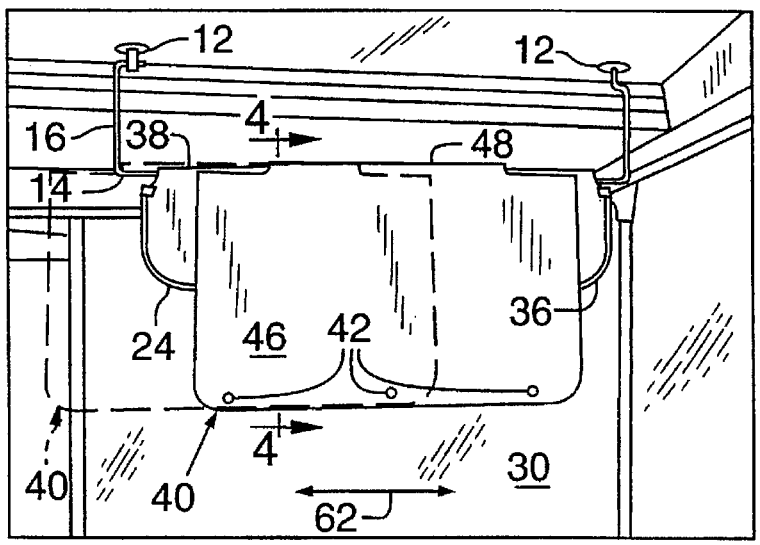
FIG. 2 is a view showing a visor extension of the present invention mounted on the conventional visor of a vehicle is illustrated in FIG. 1.
Figure 4:
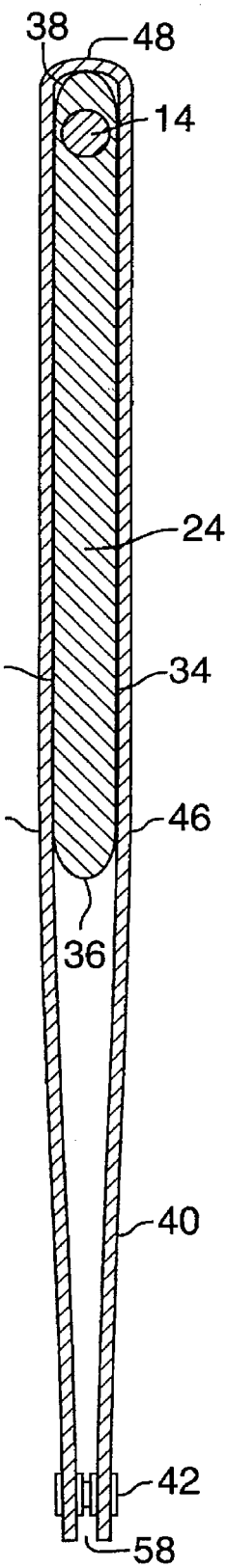
FIG. 4 is a view as viewed on view lines 4—4 of FIG. 2 further illustrating the visor extension of FIG. 2 mounted on the vehicle visor of FIG. 1; and, FIG. 5 is a view illustrating another mounting arrangement for a vehicle visor, e.g., as common to a passenger vehicle.

There are instances where the visor 24 that is normally provided in the vehicle is not adequately large enough to provide sufficient screening or shading of the sun's rays particularly when the sun is near the horizon and/or the vehicle is traveling at an angle relative to the position of the sun. With reference to FIGS. 2 and 4, to enhance the shielding or shading capability of the visor 24, a visor extension 40 of the present invention is mounted on the visor 24. The visor extension 40 is sufficiently large to extend below the vehicle visor 24 and further is adjustably movable on the visor 24 to enhance the shading capability. Although illustrated to be movable toward one side only in both FIGS. 2 and 5, it will be appreciated that the extension is designed to be movable to either side.

The visor extension 40 has a surface area that is larger than the vehicle visor 24. The visor extension 40 simply fits over the visor 24 and is secured in position on the visor 24 by releasable fasteners such as snaps 42 (the number of snaps may vary). The visor extension 40 is configured to drape over the visor 24 with the visor extension 40 and the visor 24 frictionally engaging each other, e.g., with the panels 44, 46 engaging the side faces 34 (best seen in FIG. 4).

The friction between the visor extension 40 and the visor 24 is sufficient to hold the visor extension 40 in position relative to the visor 24 yet the visor extension 40 may be moved relative to the visor 24 by an individual to adjust the position of the visor extension 40 relative to the visor 24.

Refer now to FIG. 3 which illustrates the visor extension 40 laid out flat for illustrative purposes. The visor extension 40 in this embodiment has a rear panel 44 and a front panel 46 that are substantially the same size and shape. It will be appreciated, however, that the panels 44, 46 need not be of the same size and/or shape. The panels 44, 46 have a larger surface area than the face 34 of the vehicle visor 24. The panels 44 and 46 are joined by a connecting strip of material 48 thus the upper edges of the panels 44, 46 are joined together. Again, it will be appreciated that the panels 44, 46 and strip 48 are preferably formed from a common sheet of material which is configured to provide the various design features but is otherwise an integrated sheet form. The rear panel 44 is attached to one edge 50 of the strip 48 and the front panel 46 is attached to the other edge 52 of the strip 48. As shown in the figure, the strip 48 does not extend the full length of the panels 44 and 46 but is positioned somewhat throughout the center of the panels 44, 46. The panels 44, 46 in combination with the strip 48 will thus have an open slot 54 extending from each of the side edges of the panels 44, 46 to the strip 48. The panels 44, 46 are juxtaposed one on top of the other and fastened by fasteners 42 when mounted on the visor as best seen in FIG. 4.

As previously mentioned, the visor extension of the embodiment of FIGS. 1–4 is secured on the visor 24 by snaps 42. The snaps 42 are of conventional design and have a male portion on one of the panels 44, 46 and a female portion on the other of the panels 44, 46. The snaps 42 are releasable. Thus, the visor extension 40 (as illustrated in FIGS. 2, 4 and 5) is simply slid over the vehicle visor 24 with the center strip 48 residing adjacent the edge 38 of the visor 24 that is pivotable about the rod 14. The visor 24 is between the panels 44, 46. The edges 58 of the panels 44, 46 whereat the snaps 42 are provided are brought together and in the process will urge the panels 44, 46 against corresponding side faces 34 of the visor 24. The releasable fasteners (mating snaps 42) secure the panels 44, 46 to each other.

The visor extension 40 is made of a light weight semi-rigid material that is resilient, that is, it may be deflected without permanent deformation. The panels 44, 46 will bend slightly (best seen in FIG. 4) to conform to the visor 24 when the visor extension 40 is mounted on and secured to the visor 24 by the snaps 42. The visor extension 40 secured by the snaps 42 thus will frictionally engage the visor 24 and hold the visor extension 40 in an adjusted position.

The visor extension 40 is substantially symmetrical and therefore is reversibly mountable on the visor 24. The visor extension 40 when mounted on the vehicle visor 24 thus will extend beyond the visor 24 to provide added shading of an individual seated in front of the windshield 30. The visor extension 40 being of light weight will not alter the operation of the vehicle visor 24 and thus the vehicle visor 24 with the visor extension 40 mounted thereon may be pivoted about the rod 14 in a conventional manner to any of the infinite adjustable positions.

As previously mentioned, the visor extension 40, when mounted on the vehicle visor 24 and secured by the snaps 42, is held in position on the visor 24 by frictional contact. The frictional contact is sufficient to hold the visor extension 40 in place, however, it is not sufficient to prevent an individual from adjusting the visor extension 40 on the visor 24. The visor extension 40 may be moved to multiple positions on the visor 24 to enhance the shading capability. Some of the positions are as indicated by the dashed outlines in FIG. 2. The slot 54 formed in the visor extension 40 by the center strip 48 mounted to the rear and front panels 44, 46 allows the visor extension 40 to be moved laterally beyond the vertical portion 16 of the rod 14 which supports the vehicle visor 24 as indicated by arrow 62 in FIG. 2. The visor extension 40 may be moved either to the left or to the right until the center strip 48 comes into contact with the vertical portion 16 of the rod 14.

The visor extension 40 may also be adjusted upwardly and downwardly relative to the driver/passenger by simply pivoting the rod 14 and the visor 24 as indicated by arrows 26 and 28 in FIG. 1. The large surface area of the panels 44, 46 is suitable for a visual display such as imprinting detailed information that may be of use to a user such as a map, travel information, vehicle information and the like. In this embodiment, a map 60 of the United States is imprinted on one of the panels 44, 46 and is readily visible when the visor extension 40 is mounted on the vehicle visor 24 and is pivoted downwardly.

FIG. 5 illustrates use of the extension 40 on a visor attached to a vehicle at one end only, e.g., by bracket 12' which is more typical for smaller vehicles. Because the other end is unattached, the extension 40 may be permanently attached at its lower edge, e.g., using rivets 42' (or stitching or glue, etc.) and the extension is simply slid over the visor from the attachment-free "other" end. It will also be understood that for this application the slot 54 is not required on the attachment-free end.

Those skilled in the art will recognize that modifications and variations may be made without departing from the true spirit and scope of the invention. The invention is therefore not to be determined from the embodiments described and illustrated but is to be determined from the appended claims.

What is claimed is:

1. A visor extension mountable on a vehicle visor for extending the vehicle visor shading capability, comprising;

a front panel;

a rear panel;

upper and lower edges of said front and rear panels joined together to provide an upper joining portion and a lower joining portion with said front and rear panels in spaced parallel relation;

said vehicle visor having opposed sides, a top and bottom edge, and opposed ends, and attached at least at one end to a vehicle, said upper joining portion of said visor extension engaging the top edge of the visor and a panel of said visor extension extended along each side of the visor and extended a substantial distance below the bottom edge of the visor to provide lowered shading capability, and said upper joining portion including an open slot at the attached end of the visor for slidable adjustment of the extension along the visor in either direction to provide increased side shading capability and said lower joining portion spaced Substantially below the bottom edge of the visor to provide a substantial open spacing between the panels below the bottom edge of the visor for free movement of the visor extension on the visor.

2. A visor extension as defined in claim 1, wherein the visor is attached to the vehicle at both ends, said lower joining portion of the extension being a releasable fastener for inserting one of the panels between the visor ends and over the visor and then joining the lower portions of the panels, and said upper joining portions slotted at both ends for slidable adjustment of the extension on the visor in either direction.

3. A visor extension as defined in claim 2, wherein:

a visual display is provided on one of said front and rear panels.

* * * * *